United States Patent [19]
Eslambolchi et al.

[11] Patent Number: 6,075,481
[45] Date of Patent: Jun. 13, 2000

[54] SPATIAL POSITION MAPPING TECHNIQUE

[75] Inventors: Hossein Eslambolchi, Basking Ridge, N.J.; John Sinclair Huffman, Conyers, Ga.

[73] Assignee: AT&T Corp, New York, N.Y.

[21] Appl. No.: 09/281,397

[22] Filed: Mar. 30, 1999

[51] Int. Cl.[7] .............................. H04B 7/185; G01S 5/02; G01S 3/02

[52] U.S. Cl. ................................ 342/357.08; 342/357.17; 342/459

[58] Field of Search .......................... 342/357.08, 357.17, 342/459

[56] References Cited

U.S. PATENT DOCUMENTS 5,555,503 9/1996 Kyrtsos et al. .......................... 342/357
5,899,957 5/1999 Loomis .................................... 342/357

Primary Examiner—Thomas H. Tarcza
Assistant Examiner—Fred H Mull
Attorney, Agent, or Firm—Robert B. Levy

[57] ABSTRACT

The exact position of a work location (24) is mapped by the aid of at least three differential Global Positioning Satellite (GPS) receivers (12, 14, and 16) situated proximate the work location. Each of the differential Global Positioning Satellite (GPS) receivers establishes its own exact position and transmits that information to a spatial positioning system receiver (18) at the work location that determines its position from the position of the individual differential Global Positioning Satellite (GPS) receivers.

8 Claims, 1 Drawing Sheet

SPATIAL POSITION MAPPING TECHNIQUE

TECHNICAL FIELD

This invention relates to a technique for accurately mapping facilities via Global Positioning Satellite (GPS) coordinates.

BACKGROUND ART

Providers of telecommunications services, such as AT&T, typically maintain large networks having various facilities, including thousands of kilometers of underground fiber optic cable. Accurate identification of network facilities on a geographical map while desirable is extremely expensive. Consequently, most telecommunications services provider have not undertaken widespread mapping of their facilities.

Global Positioning Satellite (GPS) systems can aid in establishing an extremely accurate spatial map. Present-day GPS system rely on a constellation of geosynchronous satellites that each transmit their position to earth on a continuous basis. A GPS receiver monitors the signals of three of more satellites and uses the satellite position information to calculate its own location. The process by which the GPS receiver calculates its position takes time, and does not yield an exact because of timing errors intentionally inserted into the satellite signals for security reasons. To partially overcome this problem, differential GPS (DGPS) receivers are now available that provide higher accuracy. A typical DGPS device makes use of known location data, such as obtained from a GPS reading, and then corrects that information by making its own GPS reading. After correcting the location information, the DGPS receiver can communicate the its corrected location information to a user in a particular area.

While affording increased accuracy, typical DGPS receivers may take even longer than a GPS receiver to provide corrected location information. Thus, spatial mapping with DGPS receivers is often time consuming, and is generally not practical in most instances where cost and time constraints exist.

BRIEF SUMMARY OF THE INVENTION

Briefly, the present invention provides a technique for spatially mapping the location of a particular activity carried out by an individual, such as location of an underground cable by a technician. In accordance with the invention, the individual performing the activity places at least three DGPS receivers in spaced relationship to the location of the activity. Before completion of the activity, each of the DGPS receivers communicates its location to a spatial position-mapping receiver at the site of the activity. The spatial position mapping system receiver receives the position information from each DGPS receiver and then computes its own position. Since each DGPS receiver provides an accurate measure of its own location, the spatial position mapping receiver can thus compute from the DGPS receiver position information the position measurement of the activity very accurately. Thus, for example, if the activity undertaken is locating an underground cable, the spatial position mapping receiver can thus provide an accurate measurement of the position where the technician has located the cable. Moreover, the spatial mapping can occur while the technician locates the buried cable, eliminating the need for the technician to separately undertake the spatial mapping separately.

DETAILED DESCRIPTION

Figure 1:
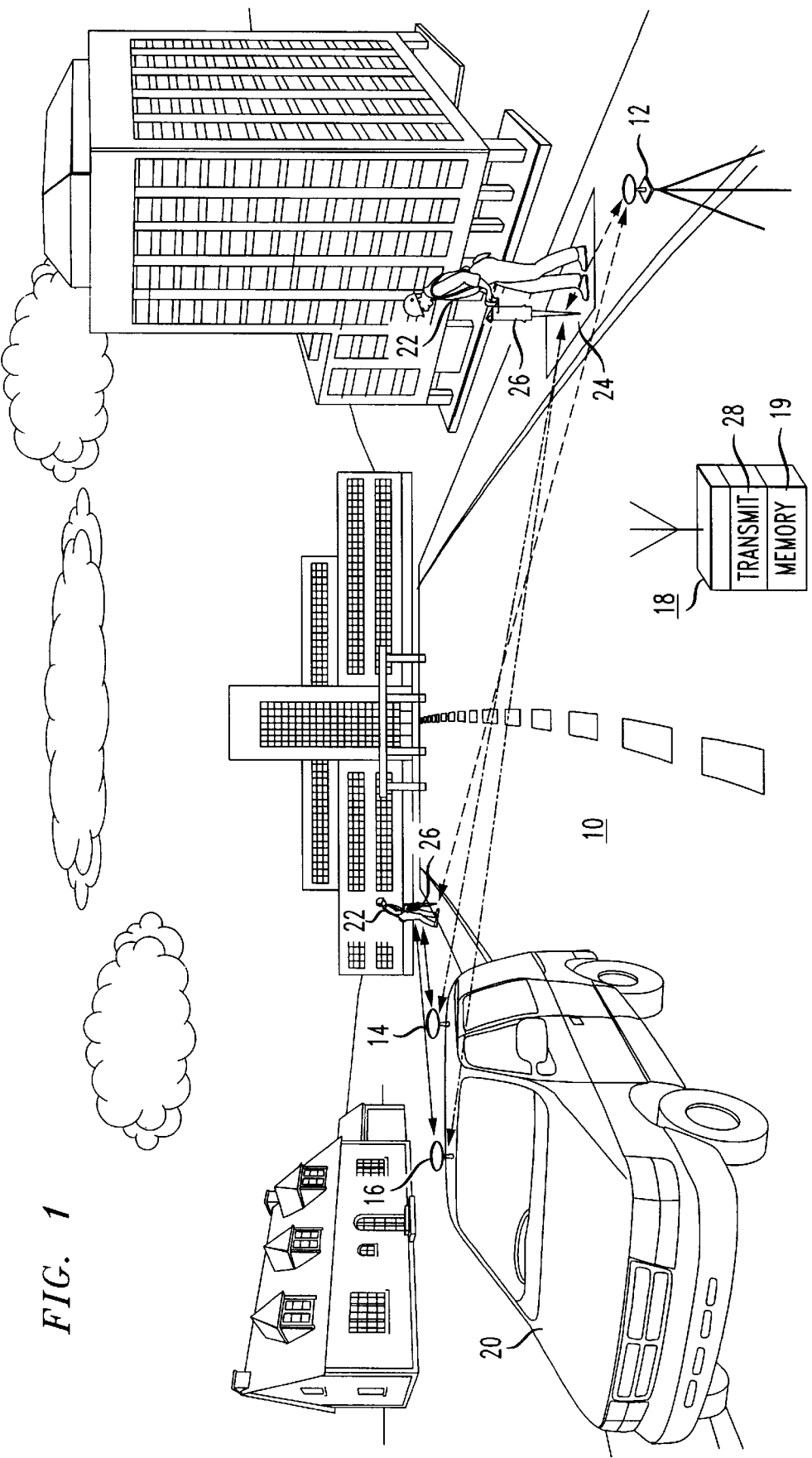
FIG. 1 depicts a block schematic diagram of a spatial position mapping system in accordance with the invention.

FIG. 1 illustrates a spatial mapping system 10 in accordance with a preferred embodiment of the invention. The system 10 includes at least three spaced-apart Differential GPS receivers 12, 14, and 16, of a type well known in the art for making differential GPS measurements of their own position. Each of the differential GPS receivers 12, 14, and 16 possesses the capability of transmitting its position information to a spatial positioning system receiver 18 that includes a memory 19 for storing such information. In the illustrated embodiment, the differential GPS receiver 12 comprises a portable device capable of set-up at any given location, whereas differential receivers 14 and 16 are permanently mounted in a vehicle 20 operated by a technician 22 for transportation to and from a work area 24, such as the site of a buried cable (not shown). Note that all three of the differential GPS receivers 12, 14, and 16 could comprise portable units, although mounting one or two of the three differential receivers within the vehicle 20 saves set-up and breakdown time.

In accordance with the invention, the three differential GPS receivers 12, 14, and 16 cooperate with the spatial position mapping receiver 18 to enable the technician 22 to accurately map the position of the work area 24. In the illustrated embodiment, the work area 24 comprises the locale within which the technician utilizes a cable locating device 26, such as the type manufactured by Radiodetection Corp. of Mahwah, N.J., to locate a buried cable. Prior to locating a buried cable within the work area 24, the technician 22 deploys the three differential GPS receivers 12, 14, and 16 in spaced relationship about the work area. In the preferred embodiment, the technician undertakes such deployment by parking the vehicle 20 in the vicinity of the work location 24, thereby deploying the differential GPS receivers 14 and 16. Thereafter, the technician manually deploys the differential GPS receiver 12.

Having deployed the differential GPS receivers 12, 14, and 16, the technician 22 then undertakes the required activity within the work area. In the illustrated embodiment, this activity takes the form of locating a buried cable with the aid of the cable-locating device 26, although the technician could undertake other activities in addition to, or in place of locating the buried cable. As the technician completes the work activity, the differential GPS receivers 12, 14, and 16 compute their individual position and communicate that information to the spatial positioning system receiver 18 for storage in the memory 19 within the receiver. From the individual position information of the differential GPS receivers 12, 14 and 16, the spatial positioning system receiver 18 calculates its position, and hence, the position of the work area 24 and stores that information in the memory 19. In this way, the technician 24 can perform the required work activity, such as locating a buried underground cable, while the spatial positioning system receiver 18 cooperates with the differential GPS receivers 12, 14 and 16 to establish the position of the work location.

In the illustrated embodiment, the spatial positioning system receiver 18 is depicted as an element physically separate from the cable-locating device 26. In practice, the spatial positioning system receiver 18 could be integrated with the cable-locating device 26, or other work devices that the technician 22 might utilize in performing an activity within the work area 24. Further, the receiver 18 could also include a wireless transmitter 28 of a type capable of initiating wireless telephone calls for communicating the work location position stored in the memory 19 to facility, such as a central office.

The foregoing discloses a scheme for spatially mapping a work location 24 while a technician 22 undertakes a work activity at that location.

The above-described embodiments merely illustrate the principles of the invention. Those skilled in the art may make various modifications and changes that will embody the principles of the invention and fall within the spirit and scope thereof.

What is claimed is:

1. A method for accurately mapping a work location at which a technician performs a work activity, comprising the steps of:

deploying at least three global differential Global Positioning Satellite receivers in spaced relation about the work location wherein two of said at least three differential Global Positioning Satellite Receivers are mounted in a vehicle located proximate the work location;

establishing, at each differential Global Positioning Satellite receiver its own position;

communicating the position of each of the differential Global Positioning Satellite receivers to a spatial positioning system receiver at the work location: and establishing, via the spatial positioning system receiver an exact position for the work location from the position information of each of the differential Global Positioning Satellite receivers.

2. The method according to claim 1 further including the step of communicating the work location from the spatial positioning system receiver to a central facility.

3. A method for accurately mapping a work location at which a technician performs a work activity, comprising the steps of:

deploying at least three global differential Global Positioning Satellite receivers in spaced relation about the work location wherein at least one of the differential Global Positioning Satellite Receivers is portable, and is deployed proximate the work area;

establishing, at each differential Global Positioning Satellite receiver its own position;

communicating the position of each of the differential Global Positioning Satellite receivers to a spatial positioning system receiver at the work location: and establishing, via the spatial positioning system receiver an exact position for the work location from the position information of each of the differential Global Positioning Satellite receivers.

4. A method for accurately mapping a work location at which a technician performs a work activity, comprising the steps of:

deploying at least three global differential Global Positioning Satellite receivers in spaced relation about the work location;

establishing, at each differential Global Positioning Satellite receiver its own position;

communicating the position of each of the differential Global Positioning Satellite receivers to a spatial positioning system receiver at the work location: and establishing, via the spatial positioning system receiver an exact position for the work location from the position information of each of the differential Global Positioning Satellite receivers;

wherein the technician performs the work activity while the differential Global Positioning Satellite receivers communicate their position to the spatial positioning system receiver at the work location.

5. The method according to claim 4 wherein the work activity includes locating a buried cable.

6. Apparatus for accurately mapping a work location at which a technician performs a work activity, comprising:

a vehicle;

at least three global differential Global Positioning Satellite receivers deployed in spaced relation about the work location, at least two of said receiver positioned within said vehicle for deployment in the vicinity of the work location, each receiver determining its own position and transmitting the information; and a spatial positioning system receiver at the work location for receiving position information from each of the differential Global Positioning Satellite receivers and for establishing, from the position information of each of the differential Global Positioning Satellite receivers, an exposition of the work location.

7. The apparatus according to claim 6 wherein the spatial positioning system receiver includes a wireless transmitter for initiating a wireless call communicating the work location position to a central facility.

8. Apparatus for accurately mapping a work location at which a technician performs a work activity, comprising:

at least three global differential Global Positioning Satellite receivers deployed in spaced relation about the work location, each receiver determining its own position and transmitting the information; and a spatial positioning system receiver at the work location for receiving position information from each of the differential Global Positioning Satellite receivers and for establishing, from the position information of each of the differential Global Positioning Satellite receivers, the position of the work location wherein the spatial positioning system receiver is integrated within a cable-locating device.

* * * * *